(No Model.)
H. RUPSCH.
SAW SET.
No. 533,611. Patented Feb. 5, 1895.
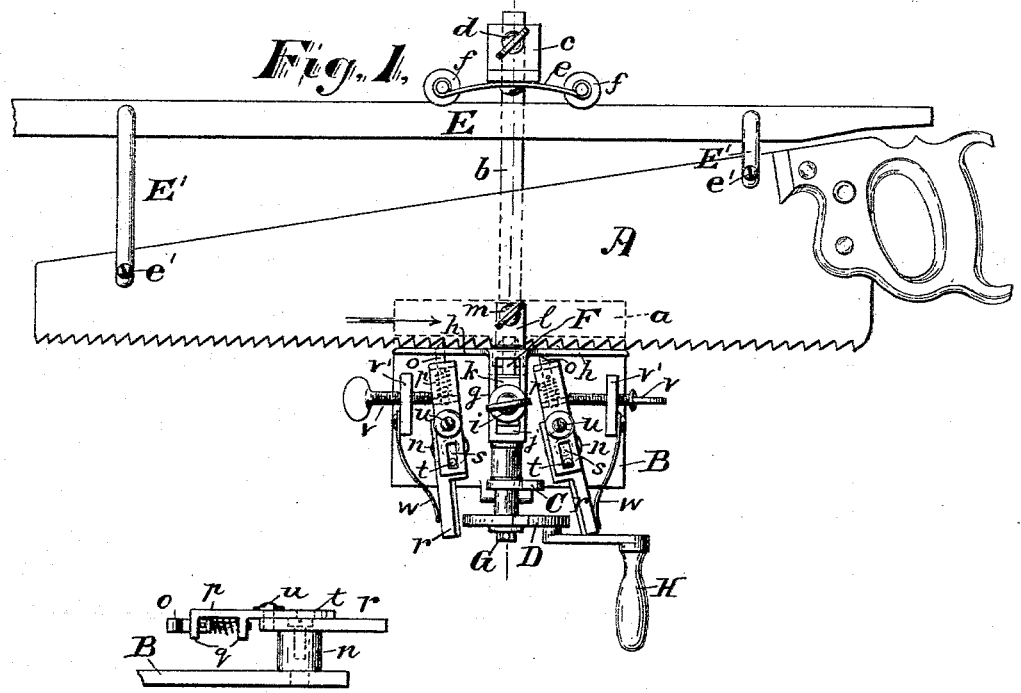
Fig. 1.
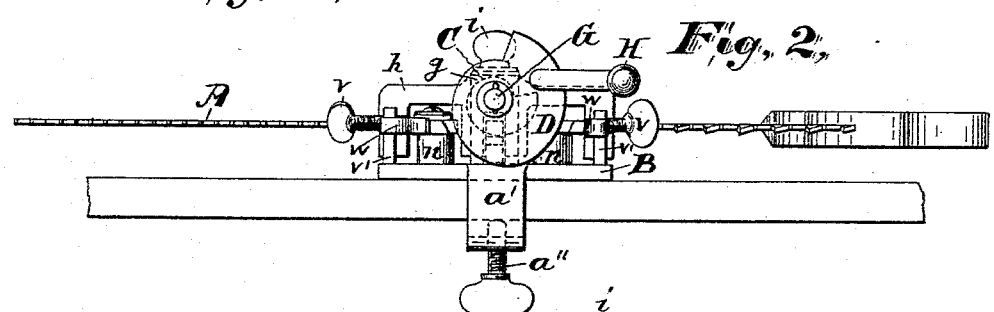
Fig. 4.
Fig. 2.
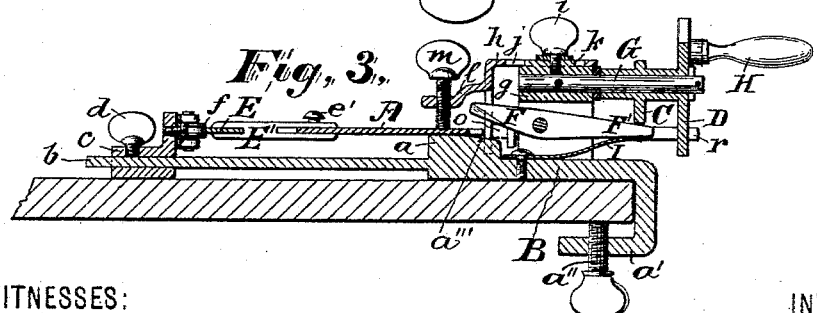
Fig. 3.
WITNESSES:
Robert Sollberger
Louisa Browne
INVENTOR
Henry Rupsch,
BY Drake & Co. ATTY'S.

UNITED STATES PATENT OFFICE.

HENRY RUPSCH, OF NEWARK, NEW JERSEY.

SAW-SET.

SPECIFICATION forming part of Letters Patent No. 533,611, dated February 5, 1895.

Application filed June 19, 1894. Serial No. 515,011. (No model.)

*To all whom it may concern:*

Be it known that I, HENRY RUPSCH, a citizen of Germany, residing at Newark, in the county of Essex and State of New Jersey, have invented certain new and useful Improvements in Saw-Sets; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to secure a perfectly true and uniform set to the teeth of a saw, and to secure other advantages and results hereinafter referred to.

The invention relates to saws having tapering blades, and it consists in the improved saw set, and in the combination and arrangement of the parts thereof, as hereinafter set forth and finally pointed out in the claims.

Referring to the accompanying drawings, in which similar letters of reference indicate corresponding parts in each of the figures where they occur, Figure 1 represents in plan, a saw set embodying my improvements, and a saw, of the character stated, adjusted therein as it appears when the set is in operative position. Fig. 2 is a front elevation of the same. Fig. 3 is a central transverse section of Fig. 1, and Fig. 4 is a detail in elevation of one of the parts of said saw set.

In said drawings, A, designates the saw, and B, a bed plate upon and to which the working parts of the device are mounted or secured. Said bed plate is provided with a shoulder, $a$, at the back edge thereof, and at the front edge with a clamp $a'$, and a set screw, $a''$, by which to secure the device to a table. Projecting from the rear of said bed plate, is a bar $b$, upon which is adjustably mounted a clamping plate $c$, which is secured in position upon said bar by means of a set screw, $d$, and carries upon an upwardly projecting shoulder thereof, a spring plate $e$, in which is mounted, at each end, a grooved roller or wheel, $f$.

Mounted upon an upwardly projecting post $g$, carried by the bed plate and preferably forming a part thereof, is a movable clamping and guide plate $h$, which is secured upon the top of said post by a set screw $i$, by means of which the said clamping and guide plate is rendered adjustable and is held in position. Said clamping plate has an arm projecting laterally therefrom and provided with a slot $j$, in which a tongue $k$, on said post, works, and by means of which the movement of said guide plate is limited. Projecting rearwardly from said clamping and guide plate is an arm $l$, carrying a set screw, $m$, by means of which the saw is clamped upon the shoulder or anvil, $a'''$.

Pivotally mounted upon a post $n$, at each side of the bed plate, is a device for moving and adjusting the saw, automatically, as the teeth are being brought into position to receive the blow of the hammer in setting said teeth. Said device comprises a spring-actuated finger, $o$, which works in a carrier, $p$, which is provided with shoulders $q$, in which the said finger works, the latter being normally held in a projected position by means of a spring coiled around the shank thereof, one end of which abuts against a pin passing through said finger, and the other end against the back or rear shoulder, $q$, of said carrier, so that the said finger is pushed inward against the resiliency of said spring. Said carrier is movably adjusted upon an arm, $r$, which is pivotally mounted upon the post and is subject to a longitudinal adjustment thereon to provide for which, a slot $s$, is formed at the rear extremity of said carrier in which works a stud, $t$, carried by said arm. The lateral adjustment is regulated by a set screw $u$, which passes through a transverse slot formed in said carrier and engages also in said arm and is loosened and tightened when the adjustments are made, as will be understood. Said finger is adapted to be adjusted to meet different lengths and sizes of teeth and is held in position by means of a set screw, $v$, which is carried by a post, $v'$, at each side of the bed plate, and a spring clamp $w$, which is also secured to said post at one end, the other end pressing against the outer extremity or near the outer extremity of said arm. Pivotally mounted in said post, $g$, the latter being mortised for the purpose, is a set hammer, F, which is provided with a tail piece F', which extends beyond the front edge of said post, the hammer end projecting beyond the rear edge of said post. Upon a shaft or bearing, G, projecting from the upper portion of said post, is mounted a rotatable sleeve which carries two cams, C and D, one of which (the inner one) is arranged to engage with the tail piece of said hammer, and the other to engage with the outer extremities of said arms, r, upon which the carriers p, are mounted, the outer cam being provided with a crank, H, by means of which the cams are simultaneously rotated, and the said hammer and fingers, o, are also operated.

It will be observed that the tail piece of the hammer is normally held upward by means of a spring, I, one end of which is secured to the bed plate, the other end engaging with the said tail piece, the result of which is to hold the hammer down normally upon the anvil.
E, designates a bar provided with arms, E', rigidly secured at one end to said bars; the opposite ends being split and adapted to receive the back of the saw and to be held and adjusted thereon by means of set screws, e', the said bar being arranged to be adjusted substantially parallel with the tooth edge of the saw. The said saw is adjusted in the clamp with the tooth edge set against the clamping and guide plate, h, and with the upper edge of said bar engaging in the grooves of the wheels, f, whereby the saw is held in the desired position while the teeth are being held in contact with the shoulder a, and in proper alignment with the anvil, a''', by means of the set screw, m, and so held thereby as to be allowed to move longitudinally, as will be understood.

In adjusting the apparatus for operation, the bar E, is first attached to the saw, as shown, and the latter is then placed in the device so that the first tooth of either of its extremities lies directly beneath the hammer. The clamping and guide plate, h, is then adjusted against the teeth and the two grooved rollers f, f, against the said bar E, so that the saw is held in position under pressure; and in contact with the shoulder a, by the set screw m. It will be seen, by reference to Fig. 1, that the pressure upon the saw, by the spring-actuated clamp, will be exactly uniform throughout the longitudinal movement of the saw in either direction. The saw being adjusted and clamped to the set, as indicated, the finger at the left must then be adjusted to the teeth and the carrier arm adjusted in its relation to the cam D, so that revolution of the latter will cause said finger to move the saw back two teeth, i. e., that each revolution of the said cam will bring a tooth alternately beneath the hammer and at the same time the revolution of the other cam C, will raise and release the hammer which, by the force of the spring is caused to strike the tooth at the proper moment with a force sufficient to impart to it the requisite set, as will be understood. The cams are thus revolved continuously, until every alternate tooth on one side of the saw has been set. This being done, the saw is reversed both endwise and sidewise and the finger on the right is adjusted to the teeth, &c., in the same manner as above described and the finger on the left placed out of adjustment. The cams are then revolved as before until the teeth upon the opposite side of the saw are set. It will thus be seen that the work is done automatically and uniformly; every blow of the hammer being delivered with precisely the same force, as will be obvious.

Having thus described the invention, what I claim as new, and wish to secure by Letters Patent of the United States, is—

1. The improved saw-set herein described, in which is combined a base plate, an anvil, a clamping device for holding the saw in proper relation to said anvil, consisting of the bar, E, arms E' connected with said bar and with the back of the saw, and the spring-actuated rollers, f, engaging with the outer edge of said bar, E; a finger to engage the teeth and move the saw in opposite directions into proper relation with the set-hammer, and cams to operate said finger and said hammer, and means for operating said cams, whereby the aforesaid mechanism is operated automatically, as set forth.

2. In a saw-set the combination with the anvil, of a guide or clamping plate, h, movable with respect to said anvil, an adjustable spring-clamp, c, e, f; a bar, E, engaging with said clamp; arms, E' connecting with said bar and the back of a saw to hold the bar substantially parallel with the toothed edge of the saw; and means for adjusting said guide or clamping plate and said spring-clamp to hold the saw in position, as set forth.

3. A saw set in which is combined a bed plate, B, having a shoulder, a, at the back thereof; a bar, b, projecting from the rear of said plate; a spring-actuated clamp adjustably mounted upon said bar, and carrying an antifriction roller, at each end thereof; a set screw, d, to hold said clamp in position; and a bar, E, engaging with said rollers and carrying arms E' of different lengths adapted to engage with the back of a saw to hold said bar parallel with the toothed edge of said saw, whereby the pressure upon the latter is equal throughout the longitudinal movement thereof, as set forth.

4. The improved saw set in which is combined a bed plate B, carrying a post, n, at each side thereof; arms, r, pivotally mounted upon said posts and having a longitudinal movement thereon; carriers, p, movably adjusted upon said arms, r; spring-actuated fingers, o, working in said carriers, and held in a projected position by said springs; set screws, v, to limit the movement of said carrier in one direction; springs, w, engaging with the arms, r, to automatically move said fingers in one direction, and a cam D, for moving them in an opposite direction to bring the teeth of a saw alternately beneath the set hammer, as set forth.

5. The improved saw set, in which is combined, a pivotally mounted set-hammer, F F', fingers, o, for moving the saw longitudinally; a shaft or bearing, G, and a rotatable sleeve mounted thereon and carrying cams C and D, one of which is arranged to engage with and operate said hammer, and the other to operate the fingers to move the saw and bring the teeth thereof alternately beneath the set hammer, as and for the purposes set forth.

In testimony that I claim the foregoing I have hereunto set my hand this 15th day of June, 1894.

HENRY RUPSCH.

Witnesses:
OLIVER DRAKE,
ROBERT SOLLBERGER.